(12) United States Patent
Denenberg

(10) Patent No.: US 8,358,766 B1
(45) Date of Patent: Jan. 22, 2013

(54) OPERATING A DIRECTORY ASSISTANCE CALL CENTER BASED UPON DIRECTORY ASSISTANCE DATABASE AND CALLER ID DATA

(75) Inventor: Jack E. Denenberg, Sammamish, WA (US)

(73) Assignee: AT&T Mobility II LLC, Atlanta, GA (US)

(*) Notice: Subject to any disclaimer, the term of this patent is extended or adjusted under 35 U.S.C. 154(b) by 1532 days.

(21) Appl. No.: 11/463,716

(22) Filed: Aug. 10, 2006

(51) Int. Cl.
*H04M 3/42* (2006.01)

(52) U.S. Cl. ............ 379/218.01; 379/201.01; 379/88.18

(58) Field of Classification Search ............. 379/218.01, 379/88.18, 201.01; 370/352
See application file for complete search history.

(56) References Cited

U.S. PATENT DOCUMENTS

| | | | |
|---|---|---|---|
| 6,590,965 B1* | 7/2003 | Poole et al. ............... 379/88.19 |
| 2003/0115203 A1* | 6/2003 | Brown et al. ............. 707/10 |
| 2005/0074109 A1* | 4/2005 | Hanson et al. ........... 379/207.04 |
| 2005/0201362 A1* | 9/2005 | Klein et al. ............... 370/352 |
| 2006/0256948 A1* | 11/2006 | Crockett et al. ......... 379/220.01 |
| 2007/0133771 A1* | 6/2007 | Stifelman et al. ........ 379/142.01 |
| 2007/0203736 A1* | 8/2007 | Ashton ..................... 705/1 |
| 2007/0242809 A1* | 10/2007 | Mousseau et al. ....... 379/88.18 |
| 2008/0101581 A1* | 5/2008 | Pearson ................... 379/218.01 |
| 2008/0153459 A1* | 6/2008 | Kansal et al. ............ 455/412.1 |
| 2009/0063474 A1* | 3/2009 | Curry et al. .............. 707/5 |

* cited by examiner

*Primary Examiner* — William Deane, Jr.
(74) *Attorney, Agent, or Firm* — Parks IP Law LLC; Mickki D. Murray, Esq.

(57) ABSTRACT

A system and method is provided to operate a directory assistance call center based upon data stored in a directory assistance database and a line information database (LIDB). A caller can access a directory assistance call center to request phone listing information about a particular party. The directory assistance call center can send a query to a directory assistance database for the requested information. Moreover, if the requested information is not found, then the directory assistance call center can send a query to a LIDB or CNAM database provider. The LIDB or CNAM database provider can forward the query to a local LIDB or CNAM database and to other remote LIDB or CNAM database providers to find the requested information.

31 Claims, 3 Drawing Sheets

FIG. 3a

300
Contact List 123-456-7890

Contact A

Contact B    302

Contact C

.
.
.

EXIT    304    VIEW

Name:

No.: 123-456-7890

Type:    306

Store to: Phone

Email Address:

Physical Address:

BACK    304    EDIT

FIG. 3c

300
123-456-7890: Edit Entry Details

Name:

No.: 123-456-7890

Type: _____    308

Store to: Phone

Email Address: _____

Physical Address: _____

CANCEL    UPDATE    CHANGE

300
123-456-7890: Edit Entry Details

Name: Contact D

No.: 123-456-7890

Type: Mobile    308

Store to: Phone

Email Address: _____

Physical Address: GA

CANCEL    304    CHANGE

OPERATING A DIRECTORY ASSISTANCE CALL CENTER BASED UPON DIRECTORY ASSISTANCE DATABASE AND CALLER ID DATA

TECHNICAL FIELD

The present invention relates to directory assistance systems, and more particularly to the operation of a directory assistance call center based upon data stored in both a directory assistance database and a caller identification service (caller ID) database.

BACKGROUND OF THE INVENTION

Directory assistance (sometimes referred to as 4-1-1) services provide local wireline telephone customers with a means to find information relevant to residence, business, and government phone listings. In early directory assistance call centers, an operator would manually find listings per a caller's request. Directory assistance call centers have since made steady improvements to increase the usefulness of the options offered by directory assistance service providers. Calls to a directory assistance call center are typically handled by a combination of an automated computer system and a directory assistance operator. A directory assistance operator can prompt a caller for information pertaining to the caller's request or the caller can be prompted by an automated system. The caller can enter the requested information on a telephone keypad, speak the requested information and/or initiate a request via another wireless or web based application that performs the lookup (i.e. from a users PC web browser while interacting with a web presentation of their online billing detail). The caller's response can be processed by a computer using appropriate software (i.e., voice recognition software if the caller speaks the requested information), or entered manually by a human operator. A query is then submitted to a database. Upon receiving the results of the query, the operator can connect the caller to a synthesized voice system that presents the query results to the caller.

Two types of common lookup methods offered by directory assistance service providers include forward and reverse lookups. To service a forward lookup request, a directory assistance operator can prompt the customer for a listing name and for locality information. The customer enters the listing and locality information on a telephone keypad and/or speaks the requested information. The listing and locality information entered by the customer can be processed by a computer using appropriate software, or entered manually by a human operator. A directory assistance database is then queried to search for the number associated with the listing. The number query contains information entered by the customer and attempts to find a matching number. Upon receiving the results of the number query, the operator typically connects the caller to a synthesized voice system that presents the query results (i.e., the requested number) to the customer and provides the user options to complete the call, receive information via a message or add the information to their address book.

To service a reverse lookup request, a directory assistance operator can prompt the customer for a number. The customer enters the number on a telephone keypad and/or speaks the number. Where a telephone keypad is used, the numbers can be sent using dual tone multi-frequency (DTMF) tones as known in the art. The number entered by the customer can be processed by a computer using appropriate software, or entered manually by a human operator. A directory assistance database is then queried to search for information associated with the phone number. The query contains the number entered by the customer and attempts to find a matching listing. Upon receiving the results of the listing query, the operator typically connects the caller to a synthesized voice system that presents the query results to the customer.

In either of these methods, the listing data provided to the customer is limited to the information stored in the directory assistance database. Unfortunately, a large amount of queries are returned with no listing data found, and since most directory assistance services are pay-per-use, the caller is billed for each time they use the service, regardless of the result. The possibility of being charged for a null result can discourage the use of the service.

Another widely used and popular feature is caller name and number identification service (caller ID). Caller ID delivers information to a call recipient regarding the identity of the party attempting to place the call. The caller ID information can include the telephone number from which the calling party is placing the call or can include both the telephone number and the name of the entity associated with that number in telephone company records. Caller ID information enables wireline and wireless telephone service providers to offer a network-based caller ID service to their subscribers. Many wireless subscribers do not currently have access to caller ID information, but instead rely on information stored in their respective devices. This information can be displayed upon the subscriber being called by someone in their contacts list. If the caller's number is not located in the contact list the subscriber may only receive the caller's telephone number.

Current directory assistance systems and methods often times fail to provide the requested information to a customer. In addition, current wireless subscribers may merely receive the number of an incoming call without additional identifying information. Thus, there is a need for a more robust directory assistance system and method for overcoming the deficiencies of existing systems.

SUMMARY OF THE INVENTION

In one embodiment the present invention provides a directory assistance call center which includes a directory assistance processing system. The directory assistance processing system can be configured to receive a reverse lookup request from a user including a telephone number. The directory assistance processing system can query a caller identification service database for caller identification information corresponding to the telephone number. The directory assistance processing system can be configured to provide the caller identification information to the user returned from the query to the user.

In some embodiments the directory assistance processing system configured to query a directory assistance database for directory assistance information corresponding to the telephone number and perform the query of the caller ID database if no directory assistance information corresponding to the telephone number is found in the directory assistance database.

The present invention also provides a method of performing a reverse lookup on a telephone number. The invented method can comprise querying a directory assistance database for directory assistance information corresponding to the telephone number, and querying a caller identification service database for caller identification information corresponding to the telephone number if no directory assistance information corresponding to the telephone number is found.

The present invention further provides a system for providing caller identification information which can receive a telephone number from a directory service processing system, and retrieve caller identification information corresponding to the telephone number.

Furthermore, the present invention provides a mobile communication device configured to transmit a telephone number selected from a list to a directory assistance processing system, and receive information corresponding to the transmitted telephone number from the directory assistance processing system. The mobile communication device can be configured to store at least a portion of the received information in its address book such as a name or address associated with the telephone number

BRIEF DESCRIPTION OF THE DRAWINGS

FIGS. 3a-3d show example mobile calling device displays according to the present invention.

DETAILED DESCRIPTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
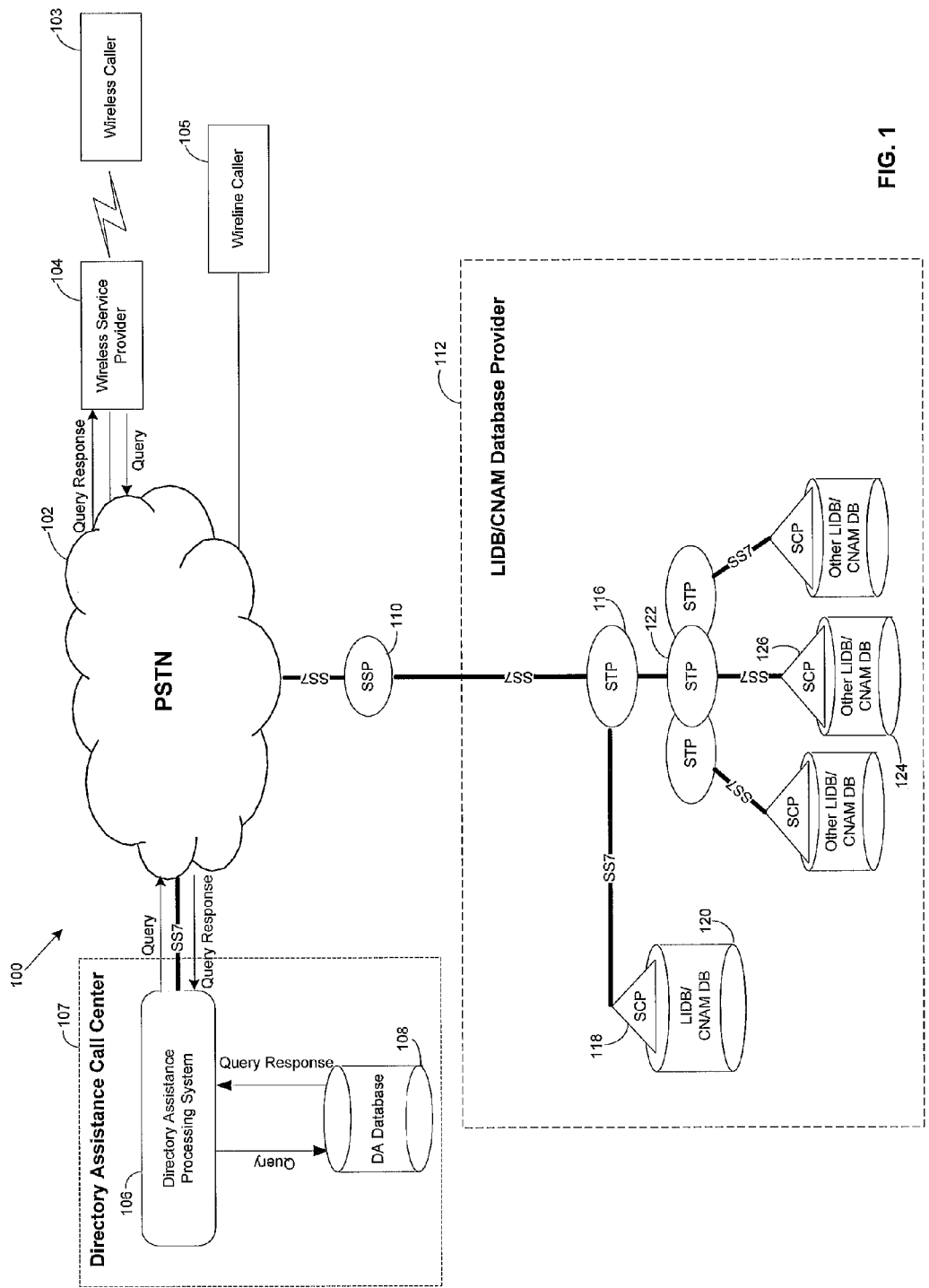
FIG. 1 is a block diagram of a directory assistance system for providing directory assistance services according to the present invention.

Referring now to the drawings wherein like numerals indicate like elements throughout the several views, FIG. 1 shows a block diagram of a directory assistance system 100, according to the present invention. The directory assistance system 100 includes an intelligent network (IN) such as a public switched telephone network (PSTN) 102, a wireless caller 103, a wireless service provider 104, a wireline caller 105, a directory assistance call center 107, a directory assistance processing system 106, a directory assistance database 108, a service switching point (SSP) 110, and a line information database (LIDB)/calling name database (CNAM) (also referred to herein as a caller ID database) provider 112. It should be understood that the terms wireless caller and wireline caller will hereinafter be referred to collectively as the caller, except in instances where the technology used (i.e., wireless or wireline) affects operation of the present invention.

The Public Switched Telephone Network (PSTN) 102 can include Signaling System 7 (SS7) protocol and architecture as is known to those skilled in the art. SS7 trunks are illustrated by the bold lines interconnecting the various elements of the directory assistance system 100 as described above. The PSTN 102 can include wireline and wireless communication networks including, but not limited, to computer networks and cellular networks. Computer networks can include, but are not limited to, the Internet, Personal Area Networks (PAN), Local Area Networks (LAN), Metropolitan Area Networks (MAN), and Wide Area Networks (WAN). Cellular networks can use cellular protocols such as, but not limited to, Time Division Multiple Access (TDMA), Code Division Multiple Access (CDMA), Universal Mobile Telecommunication System (UMTS), Global System for Mobile Communication (GSM), or any combination thereof, and the like. The wireless service provider 104 can include a base station system (not shown) in communication with the PSTN 102. The base station system can include a mobile switching center (not shown) which can be connected to one or more base station controllers (not shown). The base station controllers can in turn be connected to one or more base transceiver stations (not shown), which can be connected to antennas for radiating transmitted signals and for receiving incoming signals.

To place a call to the directory assistance call center 107, the caller can use a wireline or wireless calling device. The directory assistance call center 107 can comprise, for example, a single directory assistance call center or a plurality of distributed directory assistance call centers and can be located within the PSTN 102 or outside of the PSTN 102. Moreover, the directory assistance call center 107 can include one or more automated directory assistance call centers and/or one or more operator-based directory assistance call centers.

The directory assistance processing system 106 can include an automated menu that prompts the caller to select from a set of available directory assistance options. The menu can be presented to the user, for example, on a display of the calling device (not shown), by a voice record, and/or by a live operator. The caller can select an option from the menu using any means for selection including, but not limited to, soft buttons, hard buttons, touch pads, touch screens, trackballs, computer mice, keyboards, voice recognition software and the like. Upon selecting one of the menu options, the caller can be sent to the appropriate directory assistance service as designated by the selected option, for example, a reverse lookup service.

The directory assistance database 108 can be, for example, an operational, hierarchical, network, or relational database, as is known to those skilled in the art. In addition, the directory assistance database 108 can comprise a single directory assistance database or a plurality of directory assistance databases located within the directory assistance call center 107 or communicatively linked to the directory assistance call center 107 from within or outside of the PSTN 102.

The service switching point (SSP) 110 is a signaling point used in a Signaling System 7 (SS7) network. The primary functions of the SSP 110 are to originate, terminate, or tandem calls. The function of the SSP 110 in the illustrated directory assistance system 100 is to tandem a call from the directory assistance call center 107 and open/close a voice and/or data circuit to establish a link to the line information database (LIDB) or calling name (CNAM) database provider 112.

The LIDB/CNAM database provider 112 can be one of several LIDB/CNAM database providers that currently offer caller identification services or another LIDB/CNAM database provider. The LIDB/CNAM database provider 112 can include, a service transfer point (STP) 116, a service control point (SCP) 118, an LIDB/CNAM database 120, a group of interconnecting STPs 122, other available LIDB/CNAM databases 124, and their corresponding SCPs 126.

The service transfer point (STP) 116 can accept a query from the SSP 110 and can perform a global title translation (GTT) to determine which database is to be queried for number information. In SS7, a global title refers to a dialed number and global title translation refers to the translation of the dialed number into a series of digits that can be used by the STP to route the query to the appropriate service control point (SCP) and to its corresponding database. After the STP 116 performs a GTT, the query is sent to the appropriate SCP, for example, SCP 118.

The SCP 118 receives the query and searches its corresponding LIDB/CNAM database 120 for the requested listing information, for example, name, city, and state listing information. The LIDB/CNAM database 120 can comprise a single database or a plurality of databases located within the LIDB/CNAM database provider 112. In addition to listing information, each listing in the LIDB/CNAM database 120 can include a privacy indicator to inform the LIDB/CNAM database provider 112 that the person associated with the requested listing information does not want their information (i.e., name, city, state, etc.) provided to the directory assistance call center 106.

If the listing information requested by the query is not located in the LIDB/CNAM database 120, then the STP 116 can reroute the query to a group of interconnecting STPs 122. The group of interconnecting STPs 122 is communicatively linked to other LIDB/CNAM database providers. The group of interconnecting STPs 122 can route the query to other available LIDB/CNAM databases 124 through their corresponding SCPs 126. Typically, LIDB/CNAM database providers form a network, such that information stored in their databases can be shared over the network among each member of the network. This allows service providers to choose an LIDB/CNAM database provider to host their client's information. The client information stored in an LIDB/CNAM database of an LIDB/CNAM database provider can be accessed by other LIDB/CNAM database providers.

If listing information is found in either the LIDB/CNAM database 120 or in the other available LIDB/CNAM databases 124, a packet, including the listing information, can be sent back to the STP 116. The STP 116 can forward the packet to the SSP 110. The SSP 110 can forward the packet to the directory assistance processing system 106, terminate the call, and close the voice and/or data circuit. The directory assistance processing system 106 can receive the packet and present the enclosed listing information to the caller. It should be understood that the caller can be presented with listing information by any means for presenting including, but not limited to a display on a calling device, a voice response from a live operator, a voice response from a recorded operator, a machine-generated voice response, and the like.

If listing information and a privacy indicator with a privacy status of "not listed" is found in either the LIDB/CNAM database 120 or in the other available LIDB/CNAM databases 124, a packet, including the privacy status, can be sent back to the STP 116. The STP 116 can forward the packet to the SSP 110. The SSP 110 can forward the packet to the directory assistance processing system 106, terminate the call, and close the voice and/or data circuit. The directory assistance processing system 106 can receive the packet and inform the caller that no listing information was found. It should be understood that the caller can be informed that no listing information was found by any means for presenting as described above.

If listing information is not found in either the LIDB/CNAM database 120 or in the other available LIDB/CNAM databases 124, a packet, including a message indicating no listing information was found can be sent back to the STP 116. The STP 116 can forward the SSP 110. The SSP 110 can forward the packet to the directory assistance call center 106, terminate the call, and close the voice and/or data circuit. The directory assistance processing system 106 can receive the packet and inform the caller that no listing information was found. It should be understood that the caller can be informed that no listing information was found by any means for presenting as described above.

In one embodiment, the directory assistance processing system can be queried by a mobile handset running an application which communicates using the Internet protocol (IP) multimedia subsystem (IMS). As is known in the art, applications can communicate via IMS using session initialization protocol (SIP) messages.

Figure 2:
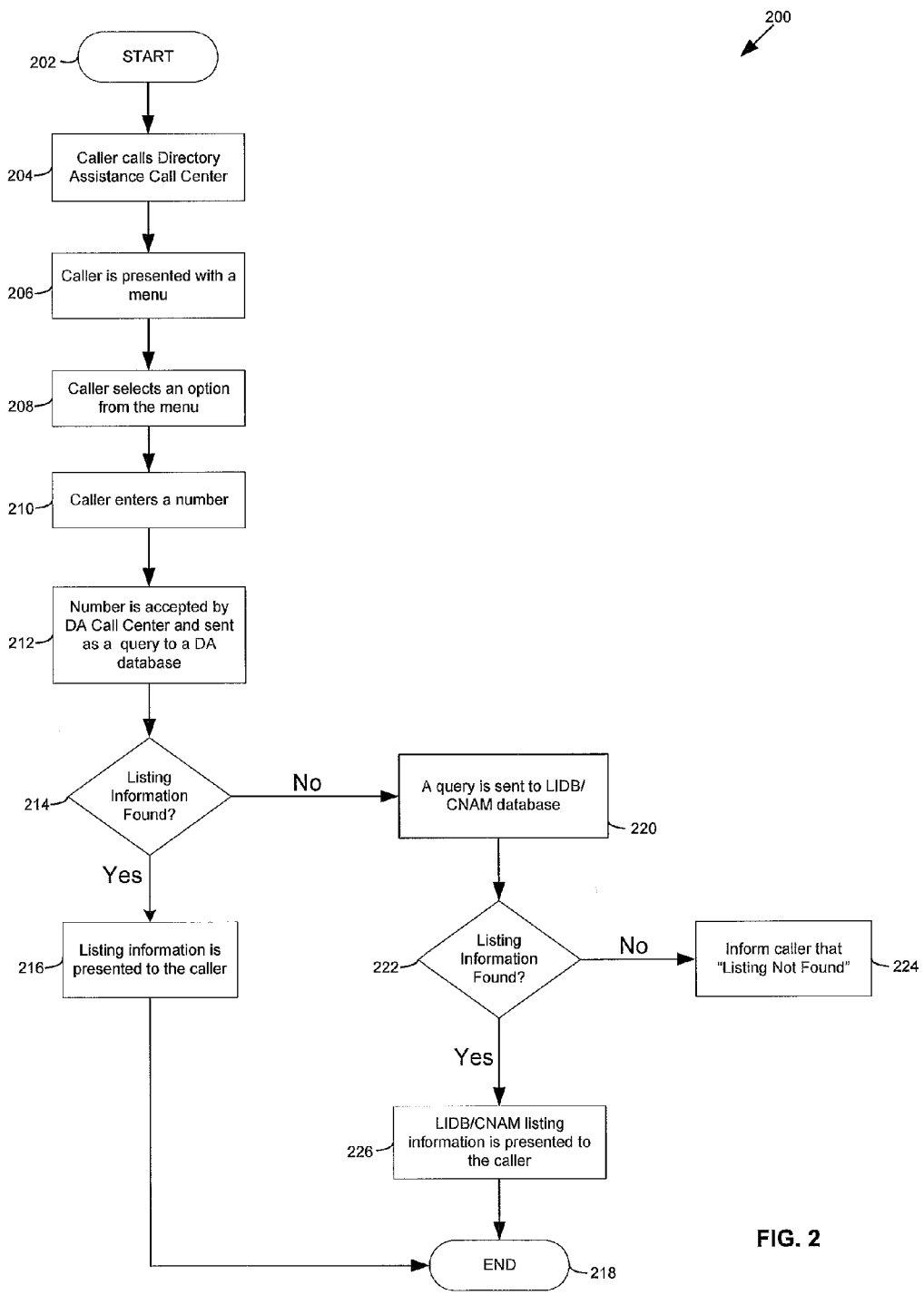
FIG. 2 is a flow chart of an exemplary method for providing directory assistance services within a directory assistance system according to the present invention.

FIG. 2 is a flow chart of an exemplary method 200, according to the present invention. It should be understood that blocks are used in the illustrated method 200 to represent the steps of an exemplary method for providing directory assistance services within a directory assistance system. Moreover, the arrangement of the illustrated blocks (steps) is not meant to limit the present invention and it is contemplated that the steps of the illustrated method 200 can be followed in any order capable of achieving a similar result.

The method 200 begins at block 202 and proceeds to block 204 where a caller can call a directory assistance call center 107. At block 206, the caller can be presented with a menu system that includes a number of directory assistance options. At block 208, the caller can select an option, for example, a reverse lookup option. The caller can be prompted for a number and at block 210 the caller can enter the number. At block 212, the number can be accepted by the directory assistance call center and sent as a query to a directory assistance database. At decision block 214, if listing information is found, then the method 200 continues to block 216, where the listing information is presented to the caller. The method 200 terminates at block 218. At decision block 214, if listing information is not found, then the method 200 continues to block 220, where a query is sent to an LIDB/CNAM database provider. At decision block 222, if listing information is not found, then the method 200 continues to block 224 where the directory assistance call center can present the caller with a message, which explains that there is no listing information available for the requested party. It is contemplated, however, that substitute information can be provided in the event that no additional listing information is available. For example, where the telephone number is associated with a business having a private branch exchange (PBX) or otherwise having a main telephone number, instead of returning a message stating "No Listing Found for 123-456-7891," the message could state "This number belongs to business A, but is not listed in directory assistance. The primary listing for calls to business A at this location is 123-456-7890", where the primary listing information is retrieved from the Caller ID database.

By further example, a portion of the requested listing information can be presented to the caller if the complete set of requested information is unavailable. For example, using an area code lookup table, database, or the like, a query can be performed based on the area code of the telephone number submitted by the caller. In such a case, the caller can be presented with, "The area code of this number corresponds to Georgia. No further information is available." Alternatively, or in addition, a query can be performed using an exchange lookup table, database, or the like. Such a lookup table can include a listing of area codes and exchanges (an exchange as used here refers to the three digits of a telephone number following the area code) recorded along with their corresponding geographic location. In such a case, the caller can be presented with, "The area code and exchange of this number corresponds to Marietta, Ga. No further information is available." At decision block 214, if listing information is found, then the listing data is presented to the caller at block 226. The method 200 terminates at block 218.

In another embodiment of the present invention, the directory assistance system 100 can be used to send listing information to a mobile device, such as a cellular telephone. FIGS. 3*a*-3*d* show a mobile calling device 300 with various exemplary displays. Referring specifically to FIG. 3*a*, a contact list display 302 is shown on mobile calling device 300. The contact list display 302 can be populated with telephone numbers that do not have associated name or address information. These numbers can appear, for example, in a mobile telephone address book and/or a missed calls list. The list display can be navigated using a cursor control of the mobile telephone and entries can be accessed by a View soft button such as that shown on the soft button menu 304. The soft button menu 304 can also include an Exit soft button. The Exit soft button can be pressed to exit the contact list display 302. It is should be understood that the soft button menu 304 can be replaced by hard buttons or by any other means for selection including touch pads, touch screens, trackballs, computer mice, keyboards, or voice recognition, any combination thereof, and the like. In the illustrated example, the telephone number, 123-456-7890, and several contact names, Contact A, Contact B, and Contact C, are shown. The telephone number, 123-456-7890, is highlighted to indicate the selected entry. The View soft button can be pressed to access detailed information pertaining to the telephone number, 123-456-7890. It is contemplated that a variety of other options can be made available to the user in the soft button menu 304. The options shown are meant to be merely illustrative and to aid in describing an exemplary embodiment of the present invention and as such are not meant to be limiting. The telephone number 123-456-7890 can be a number manually entered by the phone user, or as often occurs, the number can represent a missed call. Where the mobile phone is powered on and rings to indicate an incoming call but that call goes unanswered, the mobile phone can record the phone number of the incoming call. If the call is from a number stored in the contacts list, the contact name information can be displayed as the missed call. Often, however, only a number is recorded in the missed call log. When this occurs, the phone user may not recognize the number to determine who was attempting to call.

Referring now to FIG. 3*b*, an entry details display 306 is shown. The entry details display 306 can include several contact information fields, for example, Name, No., Type, Store to, Email Address, and Physical Address. The Name contact information field refers to an identifying name for the entry. The No. contact information field refers to a telephone number for the entry. The Type contact information field refers to the type of telephone associated with the telephone number, for example, Mobile, Home, Work, or Main. The Store to contact information field refers to a place in which the contact information is stored, for example, in Global System for Mobile communication (GSM), Store to options can include phone and Subscriber Identification Module (SIM). The Email Address contact information field refers to an email address for the entry. The Physical Address refers to a physical address for the entry, for example, street, city, and/or state information. It should be understood that the Name, No., and Physical Address are the fields capable of being updated by information stored in a directory assistance or LIDB/CNAM database in addition to being updatable by the user. The Type, Store to, and Email are only updatable by the user. The No. and Store to contact information fields, as shown, are populated with 123-456-7890 and Phone, respectively. The quantity and type of contact information fields shown are meant to be merely illustrative and to aid in describing an exemplary embodiment of the present invention and as such are not meant to be limiting. The soft button menu 304 can include a Back soft button and an Edit soft button. The Back soft button can be pressed to exit the entry details display 306 and return to the contact list display 302. The Edit soft button can be pressed to access an edit entry details display 308.

Referring to FIG. 3*c*, the edit entry details display 308 is shown. The edit entry details display 308 can include all of the same contact information fields as shown in the entry details display 306 and a contact information field placeholder. The contact information field placeholders can be edited to reflect new information known about each contact information field. In addition, the soft button menu 304 can include a Cancel soft button, an Update soft button, and a Change soft button. The Cancel soft button can be pressed to exit the edit entry details display 308 and return to the entry details display 306. The Change soft button can be pressed to individually change each contact information field. For example, a user can press the Change soft button to reveal an insert icon on the selected contact information field placeholder. The user can then use, for example, a keypad to update the selected contact information field. The Update soft button can be pressed to automatically update contact information fields.

If the Update soft button is pressed, a signal can be sent from the mobile calling device 300 to the wireless service provider 104 (as shown in FIG. 1). The wireless service provider 104 can send a query to the directory assistance processing system 107 via the PSTN 102. The query can contain the number stored in the No. contact information field, for example, to perform a reverse lookup operation. Moreover, the query can be sent via Short Message System (SMS), Signaling System 7 (SS7), or via another method known to those skilled in the art. The directory assistance processing system 106 can receive and forward the query to the directory assistance database 108. If listing information corresponding to the query is found, the directory assistance database 108 can provide the listing information to the directory processing system center 106. The directory assistance processing system 106 can then send the listing information to the mobile calling device 300 via the PSTN 102. The mobile calling device 300 can receive the listing information and parse the appropriate listing information to each contact information field, for example, as shown in FIG. 3*d*. If listing information is not found, a query can be sent from the directory assistance processing system 106 via the PSTN 102 to the LIDB/CNAM database provider 112. If listing information is not found, a message can be sent to the mobile calling device to indicate that no listing information was found. If listing information is found, the listing information can be sent to the mobile calling device 300. The mobile calling device 300 can update the appropriate contact information field or fields. This update operation can be used, for example, to obtain caller name information for a number that appears in a missed call log of the mobile phone.

FIG. 3*d* shows the edit entry details display 306 with each contact information field populated. The Name contact information field is now populated with an identifying name, Contact D. The Type contact information field is now populated with Mobile as the telephone type. The Physical Address contact information field is now populated with GA as the physical address. The soft button menu 304 can include a Cancel soft button and a Change soft button. The Cancel soft button can be pressed to exit the edit entry details display 308 and return to the entry details display 306. The Change soft button can be pressed to individually change each contact information field.

An exemplary embodiment of the present invention as described herein provides a system and method for operating a directory assistance call center based upon data stored in both a directory assistance database and a line information database (LIDB). Another exemplary embodiment of the present invention as described herein provides a system and method for automatically updating contact information fields on a display of a mobile calling device using data stored in both a directory assistance database and an LIDB.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

The invention claimed is:

1. A directory assistance call center comprising:
a directory assistance processing system having computer-readable instructions that, when executed by a processor, cause the processor to perform a method comprising:
receiving a reverse lookup request including a telephone number having an exchange;
querying a directory assistance database for directory assistance information corresponding to the telephone number;
querying, if no directory assistance information corresponding to the telephone number is found in the directory assistance database, a caller identification service database for caller identification information corresponding to the telephone number;
querying, in response to determining that no caller identification information corresponding to the telephone number is found in the caller identification service database available, an exchange lookup table for geographic information corresponding to said exchange of the telephone number; and
providing the geographic information to a user in response to receiving the geographic information.

2. The directory assistance call center of claim 1 wherein the telephone number of the reverse lookup request is received as a series of dual-tone multi-frequency signals.

3. The directory assistance call center of claim 1 wherein the telephone number of the reverse lookup request is received as text transmitted from a mobile phone of the user.

4. The directory assistance call center of claim 3 wherein the text is received in a short message service message.

5. The directory assistance call center of claim 3 wherein the text is received in a multimedia messaging service message.

6. The directory assistance call center of claim 1 wherein the instructions of the directory assistance processing system, when executed by a processor, further cause the processor to provide the caller identification information to the user.

7. The directory assistance call center of claim 6 wherein the caller identification information is provided to the user as audio output from a speaker of a mobile communication device.

8. The directory assistance call center of claim 6 wherein the caller identification information is provided to the user as a message sent to a mobile communication device, the message being in a non-audio format that can be stored in a memory of the mobile communication device.

9. The directory assistance call center of claim 8 wherein at least a portion of the message is in a format that can be stored in an address book of the mobile communication device.

10. The directory assistance call center of claim 1 wherein querying the lookup table includes querying an area code lookup table for geographic information corresponding to an area code of the telephone number if no caller identification information corresponding to the telephone number is found.

11. The directory assistance call center of claim 1 wherein the geographic information provided to the user comprises a city name.

12. The directory assistance call center of claim 1 wherein the geographic information provided to the user comprises a state name.

13. The directory assistance call center of claim 1 wherein the geographic information provided to the user comprises a county name.

14. The directory assistance call center of claim 1 wherein the telephone number of the reverse lookup request is received from a web browser via the Internet.

15. The directory assistance call center of claim 1 wherein the telephone number of the reverse lookup request is received from an Internet protocol multimedia subsystem client via a session initialization protocol request message.

16. A method, for performing a reverse lookup on a telephone number having an exchange, comprising:
receiving a reverse lookup request including the telephone number having the exchange;
querying a directory assistance database for directory assistance information corresponding to the telephone number;
querying a caller identification service database for caller identification information corresponding to the telephone number if no directory assistance information corresponding to the telephone number is found;
querying, in response to determining that no caller identification information corresponding to the telephone number is found in the caller identification service database, an exchange lookup table for geographic information corresponding to said exchange of the telephone number; and
providing the geographic information to a user in response to receiving the geographic information.

17. The method of claim 16 further comprising receiving a reverse lookup request, wherein the request includes a telephone number and providing the geographic information to the user is performed in response to said request and receiving the geographic information.

18. The method of claim 17 wherein the telephone number of the reverse lookup request is received as a series of dual-tone multi-frequency signals.

19. The method of claim 17 wherein the telephone number of the reverse lookup request is received as text transmitted from a mobile phone.

20. The directory assistance call center of claim 19 wherein the text is received in a short message service message.

21. The directory assistance call center of claim 19 wherein the text is received in a multimedia messaging service message.

22. The method of claim 17 wherein the telephone number of the reverse lookup request is received as text transmitted from a web browser.

23. The method of claim 17 wherein the caller identification information is provided to the user as audio output from a speaker of a mobile communication device.

24. The method of claim 17 wherein the caller identification information is provided to the user as a message sent to a mobile communication device, the message being in a non-audio format that can be stored in a memory of the mobile communication device.

25. The method of claim 24 wherein at least a portion of the message is in a format that can be stored in an address book of the mobile communication device.

26. The method of claim 16 wherein querying the lookup table includes querying an area code lookup table for geographic information corresponding to an area code of the telephone number if no caller identification information corresponding to the telephone number is found.

27. The method of claim 16 wherein the geographic information provided to the user comprises a city name.

28. The method of claim 16 wherein the geographic information provided to the user comprises a state name.

29. The method of claim 16 wherein the geographic information provided to the user comprises a county name.

30. A non-transitory computer-readable memory of a directory assistance processing system, the memory comprising instructions that, when executed by a processor of the directory assistance processing system, cause the processor to perform a method comprising:

receiving a reverse lookup request including the telephone number having the exchange;

querying a directory assistance database for directory assistance information corresponding to the telephone number;

querying a caller identification service database for caller identification information corresponding to the telephone number if no directory assistance information corresponding to the telephone number is found;

querying, in response to determining that no caller identification information corresponding to the telephone number is found in the caller identification service database, an exchange lookup table for geographic information corresponding to said exchange of the telephone number; and providing the geographic information to a user in response to receiving the geographic information.

31. The non-transitory computer-readable memory of claim 30 wherein the instructions, when executed by the processor of the directory assistance processing system, further cause the processor to receive a reverse lookup request including the telephone number, including said exchange, wherein the telephone number is received as one of:

a series of dual-tone multi-frequency signals;

text transmitted in a short message service message;

text transmitted in a multimedia messaging service message; and text transmitted from a web browser.

\* \* \* \* \*